Patented Feb. 8, 1944

2,341,152

UNITED STATES PATENT OFFICE 2,341,152

PROCESS FOR THE MANUFACTURE OF DRY VEGETABLE PRODUCTS

Balint Moskovits, Budapest, Hungary; vested in the Alien Property Custodian

No Drawing. Application May 19, 1941, Serial No. 394,221. In Hungary March 19, 1941

4 Claims. (Cl. 99—204)

This invention relates to a process for preserving any kind of vegetables.

As a rule, vegetables are preserved in the form of tinned or canned preserves or in that of dry products. In both cases the vegetables are subjected to preparatory operations such as cleaning, washing, comminuting etc., and thereafter are exposed, in suitable containers such as baskets of wire-work, to the action of steam or are immersed into boiling water for 1 to 2 minutes. Then the vegetables are either packed up in tin or can or glass packings which, after having been filled up with water or salt water, are hermetically sealed and sterilized in an autoclave at temperatures above 100° centigrade (tinned or canned vegetables) or they are dehydrated in suitable plants, i. e. converted into dry products.

The advantage offered by tinned or canned vegetables consists in the fact that they can be made ready for use by heating in a few minutes whereas the dry products have first to be soaked in water for some time and thereafter still need cooking for about half an hour or more. On the other hand the dry product does not require the relatively expensive tin or can or glass packings as it can be marketed and stored in the simplest packings and even without these.

The object of the invention is the manufacture of dry vegetable products which can be made ready for use by heating or cooking in a few minutes just like tinned or canned vegetables. The process consists essentially in subjecting the vegetables before their dehydration to a treatment whereby the inter-cellular substances such as hemi-cellulose and the like will undergo a partial disintegration and the cell structure be loosened and softened.

According to this process the vegetables after having been cleaned, washed and if necessary comminuted in the usual manner—which preparatory operations will be comprehended hereinafter under the term "prepared"—are subjected in a pressure-tight vessel to the action of saturated steam, having a temperature of preferably from 103° to 134° centigrade, and a superpressure of from 0.1 to 2 atmospheres. When treating a harder kind of vegetables, the temperature may even be increased to about 139° centigrade corresponding to a superpressure of 2.5 atmospheres. The vegetables to be steamed are located in the steam space of the container, i. e., above the liquid collecting at the bottom of the latter. The superpressure may be produced by a direct supply of steam to the container. Preferably the liquid collected at the bottom of the container during the treatment of a preceding charge of vegetables is, at least in part, retained there, and utilized for the formation of vapor to produce the superpressure required in the next treatment. The steam or vapor introduced into or developed within the container drives the air out of the latter whereupon the air relief valve of the container is closed. When the required conditions as to temperature and superpressure are attained, they are maintained for some time, preferably for about ½ to 1 minute, with certain vegetables of a denser structure up to about 3 minutes, in some cases even longer, and then the container, without being opened, is cooled. Cooling may be continued preferably until about 50° to 20° centigrade, and may be accelerated e. g. by means of cold water passed through pipes provided inside the container. After the cooling the container is opened, the vegetables removed and passed to the drying apparatus.

The flavoring and aromatic substances volatilized during the steaming collect in the steam space, are then precipitated during the cooling together with the condensed water and are thus partly absorbed again by the cooled vegetables. Another part of them is absorbed by the liquid collected at the bottom of the container. If a portion of this liquid is retained in the container, the flavoring and aromatic substances contained in it will volatilize again. The retaining and reemployment of a portion of the liquid may be repeated so long as it does not become too rich in undesired substances. The liquid left behind in the individual working operations may also be collected in a separate steam generator and the steam produced therein and containing volatilized flavoring substances be introduced into the container.

It has been found to be particularly advantageous to carry out the steaming in the presence, besides the steam, of certain gases, especially carbon dioxide and/or sulphur dioxide. Some of the carbon dioxide will dissolve on the moist surface of the vegetables treated and the presence of the $H_2CO_3$-acid thus formed will have a favorable effect on the disintegration of the hemicellulose. Owing to this effect of the carbon dioxide a superpressure of only about 0.1 at. and a temperature of about 103° centigrade will suffice with vegetables of a tenderer kind. On applying, however, a somewhat higher temperature, the treatment may be achieved in less time which is favorable for the color of the product. Another advantage of the presence of carbon dioxide consists in its known protecting effect on the vitamins.

The carbon dioxide is employed in quantities of from 5 to 50 per cent, calculated on the volume of steam present. When using sulphur dioxide, preferably quantities of from 0.5 to 10.0 per cent are used, equally calculated on the volume of the steam. Both gases may also be employed simultaneously. The gases may be added to the container during the steaming or they may be introduced, for instance in the form of their aqueous solutions, before the container is closed.

It has already been suggested to pass a current of hot steam through vegetables located within a container but this manner of working has proved disadvantageous among other reasons for the one that at least a part of the volatile oils and thus of the flavoring and aromatic substances of the vegetables was entrained by the steam. It has also been proposed to free the vegetables from their juices by pressing or centrifuging, to concentrate the separated juices to a far-going extent, and to return them to the vegetables under treatment before or after the dehydration. This manner of working, however, besides being rather complicated supplies dry vegetables which, contrary to the product in accordance with the invention, have to be soaked and cooked for some time before being ready for use.

The invention is illustrated in the following examples.

*Example 1.*—100 kgs. of cabbage, after the usual preparation, are placed into baskets of wirework and brought into a double-walled autoclave adapted to be heated which already contains 10 litres of water. The autoclave is then closed and heating begun with. As soon as the air vent of the container lets out pure steam, it is closed and the heating continued until a superpressure of 0.5 atmosphere is attained. This superpressure is maintained for about 2½ minutes. Then the heating is stopped, the container cooled to about 20° centigrade and opened. The cooled vegetables are removed and dried in a drying apparatus having walls of wicker-work. There are obtained about 9 kgs. of dry cabbage which after boiling in water for about 2 minutes will be ready for consumption.

*Example 2.*—100 kgs. of carrots, after preparation, are brought into an autoclave which contains about 10 litres of the liquid collected therein during a preceding working operation. After elimination of the air, saturated steam having a temperature of 128° centigrade and also carbon dioxide, in a quantity of about 25 per cent of the volume of the steam, are introduced into the autoclave. The temperature of 128° C. is maintained for about 3 minutes. After cooling the autoclave is opened and the vegetables are removed and dried.

*Example 3.*—100 kgs. of celery, duly prepared, are brought into an autoclave which already contains such quantities of an aqueous sulphurous acid solution as on heating of the autoclave will give rise to the formation of about 5 volume per cent of $SO_2$ in the vapor space. The further procedure is the same as in Example 1.

I claim:

1. A process for the production of a dehydrated vegetable product, consisting in partially disintegrating the inner cellular substances by subjecting the vegetable to heat and pressure in the presence of carbon dioxide, cooling the product without admitting air thereto, and dehydrating the cooled product.

2. The process for dehydrating vegetables which consists in partially disintegrating the inner cellular vegetable substance by subjecting it under pressure in an atmosphere of carbon dioxide-laden steam, cooling the product without exposure to air and thereafter dehydrating the product.

3. The process for dehydrating vegetables which consists in partially disintegrating the inner cellular vegetable substance by subjecting it for not to exceed three minutes to a pressure of approximately one atmosphere in an atmosphere of carbon dioxide-laden steam at a temperature of approximately 128° C., cooling the product without exposure to air to approximately 20° C. and thereafter dehydrating the product.

4. The process of dehydrating vegetables which consists in partially disintegrating the inner cellular vegetable substance by subjecting it to steam under pressure in the presence of carbon dioxide, cooling the product in the presence of the carbon dioxide and the entrained volatile flavoring extracts from the treatment and thereafter dehydrating the product.

BALINT MOSKOVITS.